2,740,775

PROCESS FOR THE PREPARATION OF RIBO-
FLAVIN-5'-MONOPHOSPHORIC ACID ESTER

Paul Karrer and Max Viscontini, Zurich, Switzerland, assignors to Hoffmann-La Roche Inc., Nutley, N. J., a corporation of New Jersey No Drawing. Application November 13, 1952,
Serial No. 320,344

Claims priority, application Switzerland
December 10, 1951

3 Claims. (Cl. 260—211.3)

The present invention relates to the preparation of riboflavin-5'-monophosphoric acid ester of the formula

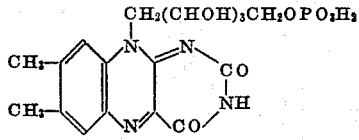

The said riboflavin-5'-monophosphoric acid ester plays an important part in the metabolism, more particularly as a coferment.

The invention provides a new process for the manufacture of riboflavin-5'-monophosphoric acid ester, which process comprises reacting riboflavin with meta-phosphoric acid, hydrolysing the crude mixture of polyphosphoric acid esters obtained and separating riboflavin-5'-monophosphoric acid ester, by fractional crystallization and salt formation, from the mixture of riboflavin-5'-monophosphoric acid ester, riboflavin-diphosphoric acid ester and riboflavin formed.

A preferred procedure of phosphorylation consists in introducing riboflavin into meta-phosphoric acid and heating the mixture for about 10–15 minutes to 60° C. The mixture of riboflavin-polyphosphoric acid esters formed may then be hydrolysed by means of an aqueous mineral acid. This hydrolizing reaction leads to the formation of a mixture of a minor part riboflavin and riboflavin-5'-polyphosphoric acid ester (mostly the diphosphate) and of a major part of riboflavin-5'-monophosphoric acid esters. When fractionally crystallizing this mixture in water, two fractions are obtained, the more soluble one containing riboflavin diphosphoric acid ester, whereas the less soluble fraction contains the other riboflavin phosphates, as well as riboflavin itself. This last fraction may now be treated with sodium hydrogen carbonate, whereupon riboflavin-5'-monophosphoric acid ester goes into solution and riboflavin remains undissolved. After having separated off the undissolved riboflavin, the riboflavin-5'-monophosphoric acid ester may be isolated from the solution, for instance by acidifying the latter and concentrating the same in vacuo.

The riboflavin-5'-monophosphoric acid ester is a compound which forms crystal needles and which is only slightly soluble in hot water. The calcium salt thereof is difficultly soluble in water, whereas the solubility of the magnesium salt is substantial and the sodium and potassium salts are very easily water-soluble.

*Example*

To meta-phosphoric acid, prepared by heating of 7 cc. of 85% ortho-phosphoric acid, is added 1 g. of finely powdered riboflavin and the mixture is heated to 60° C. for 10–15 minutes. After cooling, the reaction mixture is taken up in 5–6 cc. of water, whereupon a solid residue, consisting substantially of riboflavin which has not reacted, is centrifuged off. The clear solution is poured into 50 cc. of absolute ethanol. A yellow flaky precipitate of polyphosphates of riboflavin separates, is centrifuged off and washed with alcohol and ether. Yield: 1.3 g.

The last mentioned hygroscopic crude product is dissolved in 100 cc. of N hydrochloric acid, the solution is heated to 100° C. for 10 minutes, then concentrated to dryness in vacuo. The residue is triturated with 30 cc. of absolute ethanol, the undissolved parts are centrifuged off and washed with alcohol and ether. This operation yields 900 mg. of a non-hygroscopic precipitate which, as a paper chromatogram thereof shows, consists of a minor parts of riboflavin and riboflavin-diphosphoric acid ester and of a major part of riboflavin-5'-monophosphoric acid ester.

The said crude non-hygroscopic product (900 mg.) is dissolved in 20 cc. of water. From this solution, a mixture of riboflavin and riboflavin-5'-monophosphoric acid ester crystallizes out within the next 24 hours (500 mg.), whereas the riboflavin-diphosphoric acid ester remains dissolved in the liquid phase. If the precipitate still contains some diphosphate, then a further crystallization in water is necessary.

Now, the precipitate consisting of riboflavin and riboflavin-5'-monophosphoric acid ester is suspended in 20 cc. of water and carefully adjusted to the neutral point by means of a sodium hydrogen carbonate solution. The riboflavin-5'-monophosphoric acid ester goes into solution in the form of its sodium salt, while riboflavin remains undissolved. After having added a little charcoal, the insoluble parts are separated, the clear filtrate is weakly acidified with hydrochloric acid and then concentrated in vacuo. After a short while, practically pure riboflavin-5'-monophosphoric acid ester crystallizes out of this solution. The crystals build small aggregates of needles. After drying in vacuo at 70° C., the compound contains 3 molecules of water.

We claim:

1. A process for the production of riboflavin-5'-monophosphoric acid ester which comprises reacting riboflavin with metaphosphoric acid, hydrolyzing the mixture of phosphoric acid esters so obtained, separating from the hydrolysis product a riboflavin-5'-monophosphoric acid ester fraction by fractional crystallization, and isolating riboflavin-5'-monophosphoric acid ester by treating the aforesaid fraction with an alkali metal salt.

2. The process of claim 1, wherein the phosphorylation of riboflavin is effected by heating a mixture of riboflavin and meta-phosphoric acid for 10–15 minutes to about 60° C.

3. The process of claim 1, wherein the hydrolysis of the crude phosphorylation product is effected by means of an aqueous mineral acid.

References Cited in the file of this patent

UNITED STATES PATENTS 2,535,385   Breivogel _____ Dec. 26, 1950